United States Patent [19]

Cougan

[11] Patent Number: 4,817,907

[45] Date of Patent: Apr. 4, 1989

[54] BRACKET ASSEMBLY

[76] Inventor: Kenneth S. Cougan, P.O. Box 125, Margate, Queensland, Australia, 4019

[21] Appl. No.: 125,839

[22] Filed: Nov. 27, 1987

[30] Foreign Application Priority Data

Nov. 26, 1987 [AU] Australia ............................. PH9176

[51] Int. Cl.⁴ ............................................ F16M 13/00

[52] U.S. Cl. ..................................... 248/558; 248/208

[58] Field of Search ............... 248/558, 208, 236, 201, 248/235; 160/903

[56] References Cited

U.S. PATENT DOCUMENTS 4,033,531 7/1977 Levine ................................ 248/558

FOREIGN PATENT DOCUMENTS 2828477 1/1980 Fed. Rep. of Germany ...... 248/558

*Primary Examiner*—Ramon O. Ramirez

*Attorney, Agent, or Firm*—Roylance, Abrams, Berdo & Goodman

[57] ABSTRACT

A bracket assembly comprising first and second members similar to each other but having opposite hands, and having an attachment arm and an engagement arm. The attachment arm having a plurality of attachment slots or apertures and the engagement arm having one or more elongated slots. The arrangement is such that in use relative movement between the first and second members may take place to allow for height adjustment.

5 Claims, 12 Drawing Sheets

BRACKET ASSEMBLY

This invention relates to an improved bracket assmebly suitable for use in mounting of doors and in particular roller doors to appropriate supports such as door jambs, doorways and architraves.

Hitherto roller doors were mounted to or suspended from doorways by support brackets which were usually L shaped in front elevation as well as L-shaped in cross-section having a vertical section as well as a horizontal section.

There was usually provided attachment slots in one horizontal flange for attachment of a roller door as well as attachment slots in one vertical flange for attachment of the bracket to the door jamb or frame member defining a side of the doorway.

These conventional support brackets for roller doors included a number of disadvantages which are set out hereinbelow.

Sometimes bricks can crumble easily and it is necessary to reduce the load on individual bolts by increasing the number of bolts and spreading them over a larger area. In regard to use of the conventional support bracket this could only be achieved by the use of an additional extension bracket which effectively increased the length of the vertical section of the support bracket. This was found to be undesirable because of the necessity of using the additional extension bracket. Also it was found that sometimes the top brick of a pier of column at the side of a doorway has insufficient load on it to ensure that it will remain steady when drilling, and often the whole brick can become loose. In this particular case it was also found necessary to utilize an extension bracket.

The conventional support bracket was also difficult to use when it was necessary to fix the bracket entirely to the head of the doorway and was also not versatile in operation as it only had a single fixed orientation in use. When it was necessary to lengthen the vertical section for example it was necessary to use an additional extension bracket as described above.

It also had to be borne in mind that in regard to installation of roller doors it was necessary to have the two side jambs and head rail all in the same vertical plane. In regard to use of the conventional support bracket if the jambs or head rail were not in the same vertical plane it was also necessary to use extension brackets or extension arms in conjunction with the conventional bracket to achieve this objective. This was undesirable in that it inflated installation costs and involved the use of too many parts.

It also had to be borne in mind that the conventional support bracket was a rigid member having no facility for height adjustment. When the vertical section was being attached to jambs formed from brickwork, timberbeams or steel columns if one wanted to adjust the height of the bracket it was necessary to drill holes in the jambs and undo the original fixing or attachment and retention bracket. However, this was a procedure that should be avoided because the original strength of the fixing could be lessened considerably. Also if one bracket was adjusted it was usually necessary to make a corresponding adjustment with the other bracket. In any event adjustment ws extremely limited because this was governed by the number of slots in the vertical section.

It therefore is an object of the invention to provide a bracket assembly which may alleviate the aforementioned disadvantages associated with the prior art.

The bracket assembly of the invention includes a first member and a second member and releasable attachment means interconnecting the first member and the second member. Each of the first member and second member may include an elongate slot. The arrangement is such that in use relative movement between the first member and second member may take place to allow for height adjustment.

In a preferred embodiment of the invention each of the first member and the second member are similar to each other but have opposite hands. In other words the first member and the second member when laid on a flat surface in opposed relationship may have an axis of substantially bilateral symmetry.

Each of the first and second members is suitably L shaped in cross section having an attachment arm and an engagement arm. Suitably the attachment arm has a plurality of attachment slots or apertures and the engagement arm is provided with a single elongate slot or a pair of elongate slots separated from each other by a reinforcing web. However, it will be appreciated that the plurality of attachment apertures or slots may be replaced by a single elongate attachment slot if desired. Suitably the attachment arm is of constant width and is relatively narrow in width. The engagement arm is suitably in the shape of a right angled triangle although this is not essential and any suitable alternative shape (eg. rectangular) may be adopted.

There is provided releasable attachment means between the first member and the second member and this may be of any suitable type.

In one form the first member and the second member may be provided with one or more retaining projections which are suitably but not necessarily punched out from a metal plate comprising the engagement arm by a suitable tool or machine.

Preferably there are provided a plurality of retaining projections and these may be located in a base portion of the right angled triangle (ie. remote from the apex of the triangle). Suitably a pair of retaining projections are provided with each projection extending in different directions from the plane of the engagement arm in side view.

In use the pair of retaining projections of one member (ie. first member or second member) may engage in the elongate slot of the other member and be retained in this position by a bolt passing through a retaining aperturesuitably located intermediate and substantially colinear with the pair of retaining projections. When attached in this manner the roller door may be attached to the attachment arm of the first or second member and the attachment arm of the other member may be attached to the door jamb by one or more bolts extending through the plurality of attachment apertures.

It therefore will be appreciated that relative movement between the first member and the second member can be easily carried out simply by removal or unfastening of the retaining bolt and moving one or both members.

Other releasable attachment means may be utilized in substitution of the releasable attachment means described above.

For example the engagement arm of one of the first or second members may include a row of retaining apertures which are substantially colinear and which may be aligned with the elongate slot(s) of the engagement arm of the other member. Retaining bolts may then be utilized to interconnect the retaining apertures with the aligned elongate slot. In another variation aligned retaining slots in both engagement arms may be utilized which are interconnected together by bolts or other suitable fasteners.

In the aforementioned discussion it will be appreciated that one of the first or second members may assume a vertical orientation in use with its respectiveattachment arm attached to a door jamb. In this situation the other member may assume a horizontal orientation in use with its attachment arm attached to the roller door. This will be apparent from the drawings hereinafter.

Reference may now be made to a preferred embodiment of the invention as described in the accompanying drawings wherein.

Figure 1:
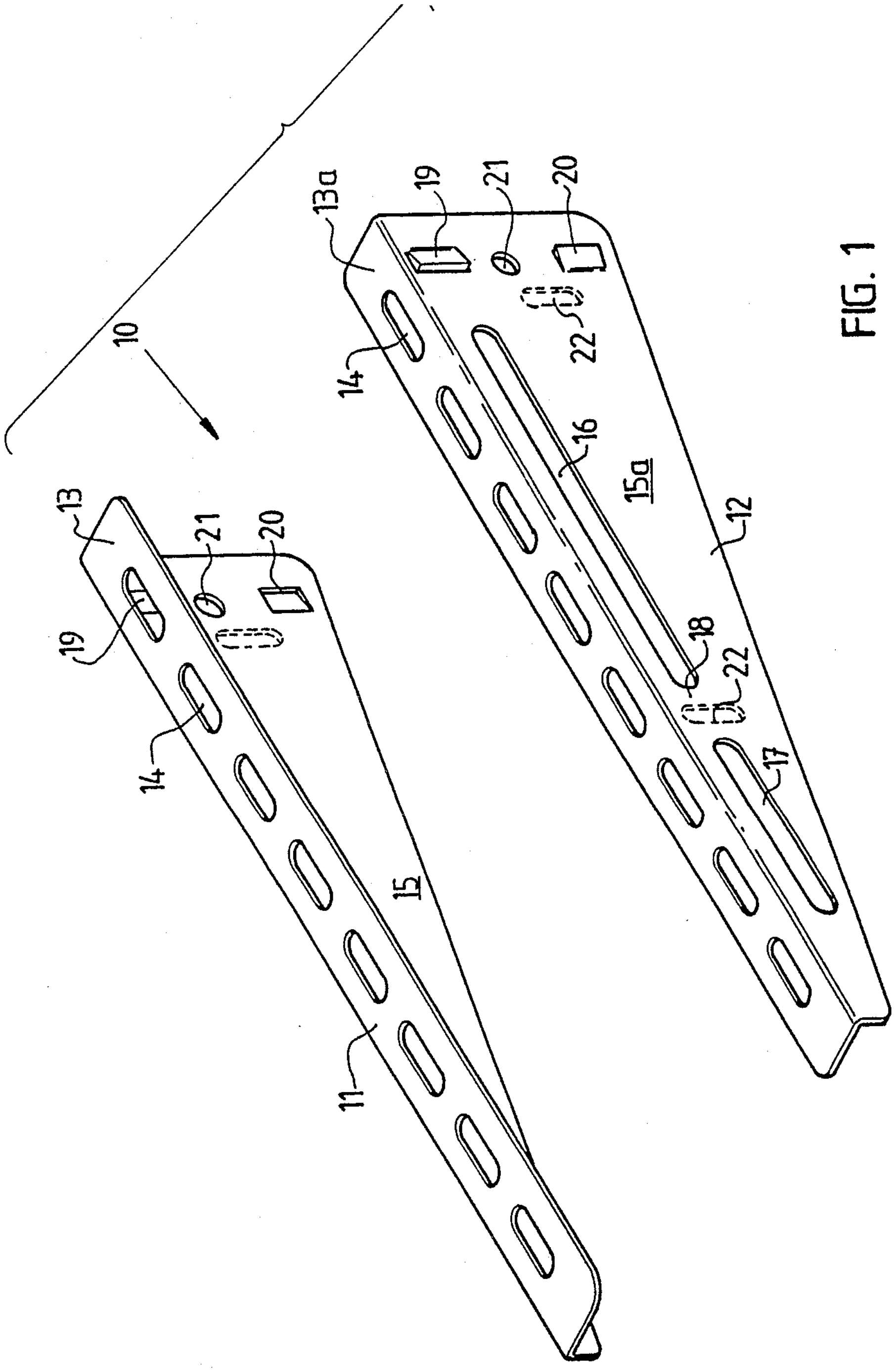
FIG. 1 is a perspective view of a brcket assembly comprising both first member and second member arranged in alignment with each other.
Figure 9:
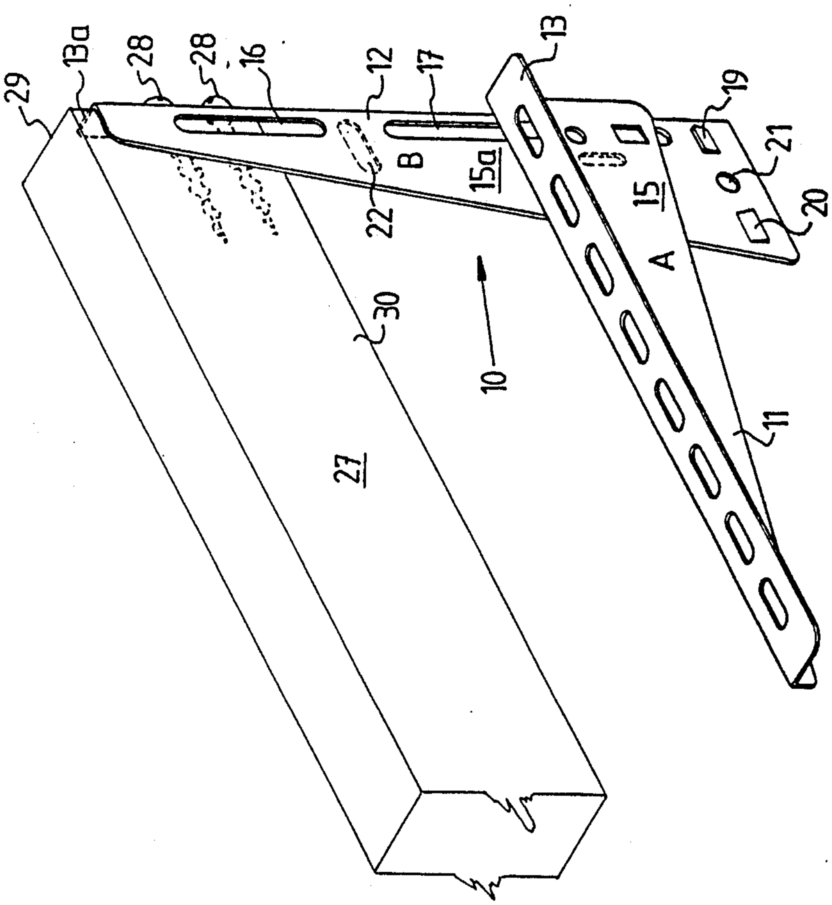
FIG. 9 shows attachment of a bracket assembly as shown in FIG. 1 to a head of a doorway.
Figure 10:
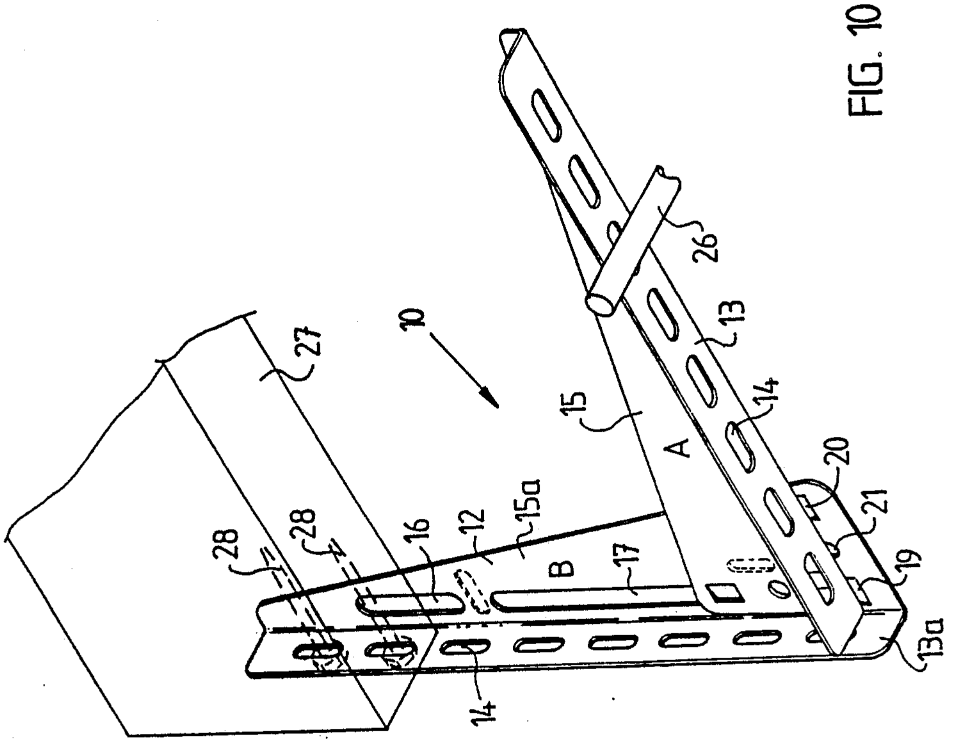
FIG. 10 is a similar view to that shown in FIG. 9 but showing the attachment to the head of a bracket assembly on the other side of the doorway.
Figure 11:
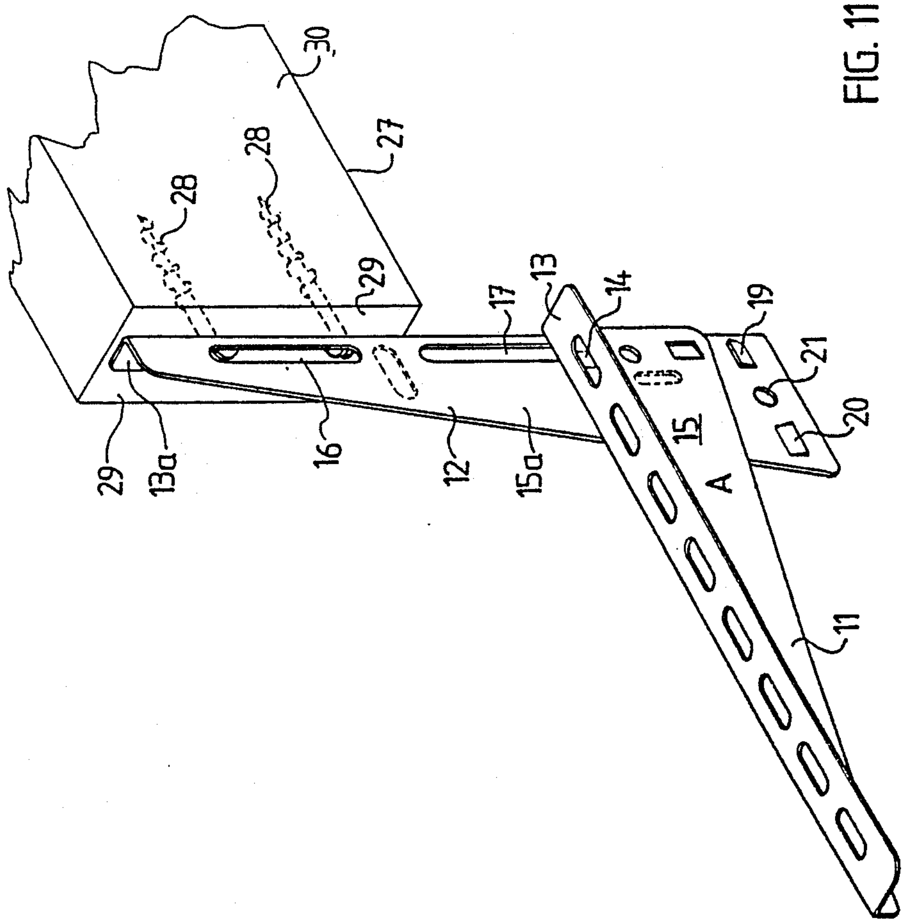
Figure 12:
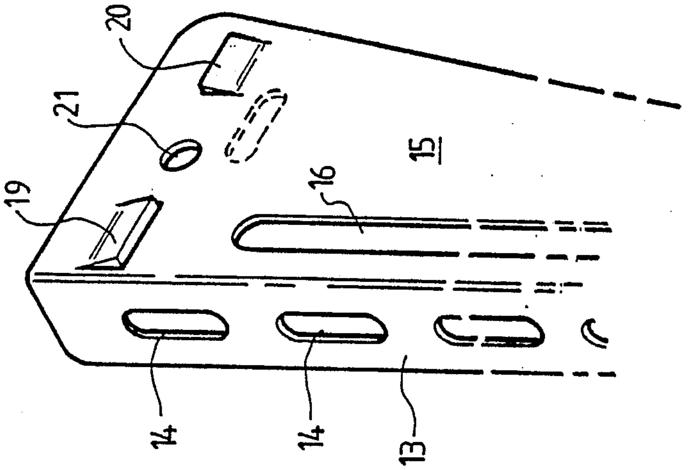

FIG. 11 also shows attachment of a bracket assembly as shown in FIG. 1 to the head of a doorway but illustrating a different arrangement to that shown in FIGS. 9 or 10 ; and FIG. 12 is an enlarged view of the retaining projections included in said first member and said second member.

In the drawings there is shown opposed first and second members of the bracket assembly 10 of the invention whereby for the sake of convenience one member 11 may be termed the first member and the other member 12 may be termed the second member. However, it will be appreciated that these may be reversed.

In any event as will be apparent hereinafter the first member in some cases may assume a horizontal or vertical orientation and in such cases the second member may assume a vertical or horizontal orientation.

Member 11 includes attachment arm 13 having attachment apertures 14 as well as engagement arm 15. Member 12 includes attachment arm 13A having attachment apertures 14 and engagement arm 15A which has elongate slots 16 and 17 separated by web 18. There is also shown retaining projections 19 and 20 on members 11 and 12 as well as retaining aperture or bolt hole 21 located between projections 19 and 20. Also shown are securing slots 22 which are utilized in the embodiment shown in FIG. 7. As shown in FIG. 1 each component 11 and 12 is of opposite hand but having an axis of bilateral symmetry.

Figure 2:
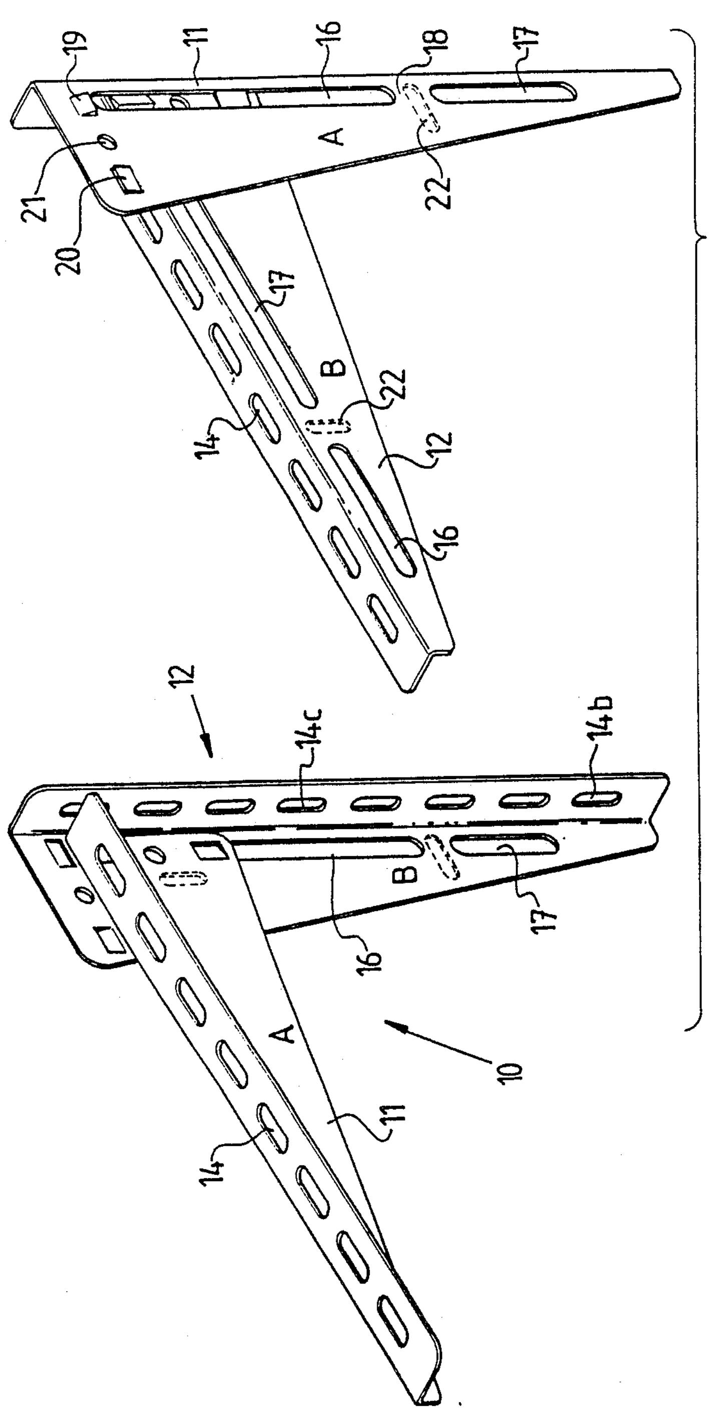
FIG. 2 is a perspective view of both first or horizontal members and second or vertical members on one side of a doorway and a further perspective view of first or vertical member and second or horizontal member on the other side of the doorway.

In FIG. 2 each bracket assembly is arranged as if it were in position on each side of a doorway (not shown). On the left hand side horizontal member 11 is shown as well as vertical member 12. However, on the right hand side the arrangement is reversed as illustrated.

Figure 3:
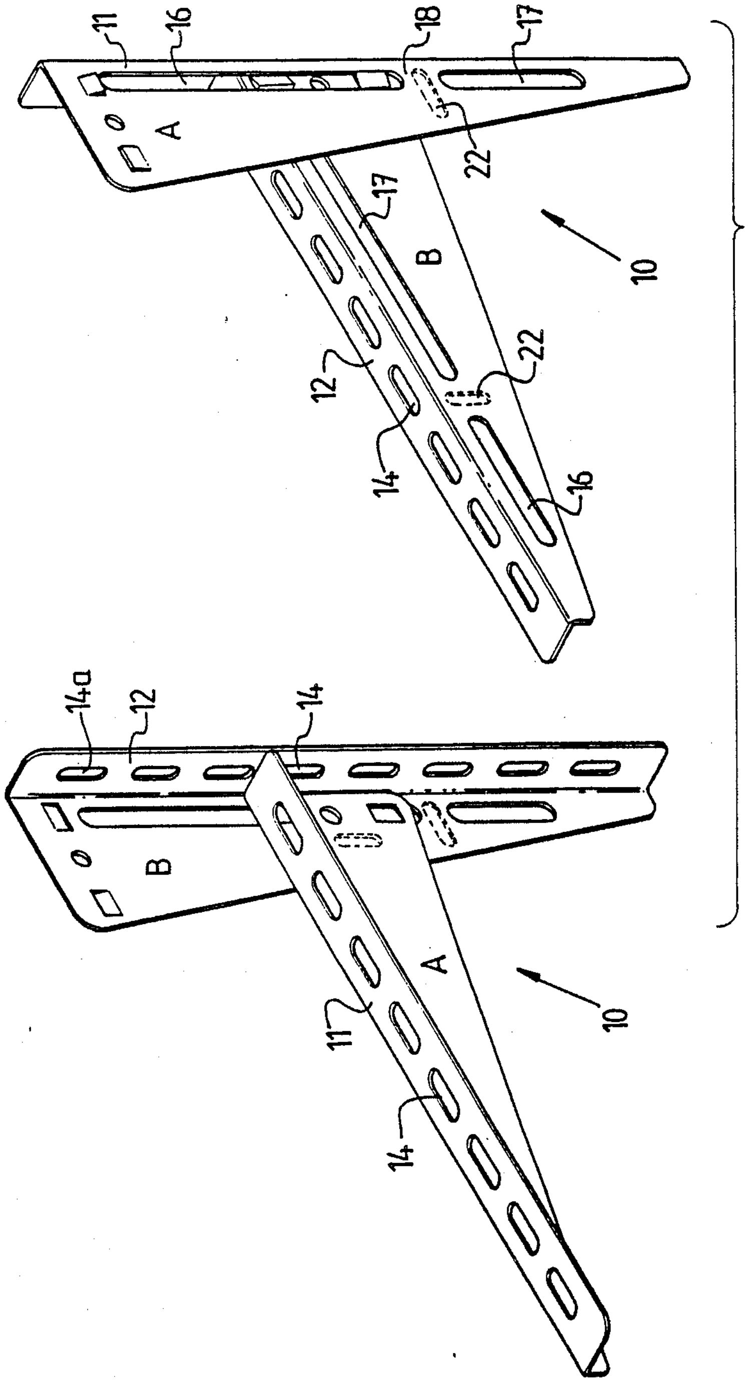
FIG. 3 is a similar view to FIG. 2 showing adjustment of the respective horizontal members on each side of the doorway.

FIG. 3 shows a similar arrangement to that shown in FIG. 2 but wherein each of the horizonrtal members on each side of the doorway have been moved downwardly in comparison to the arrangement shown in FIG. 2.

In use the retaining projections 19 and 20 of one member may engage in elongate slots 16 and 17 of the other member and be retained therein by a bolt being inserted through slots 16 or 17 and aligned bolt hole 21. However, the arrangement by the simple disconnection of the bolt engaging with bolt hole 21 may be easily adjusted to adopt whatever arrangement is desired.

The attachment apertures 14 of the horizontal member 11 or 12 may be used to attach the horizontal member to a roller door. Also the attachment apertures 14 of the vertical member 11 or 12 may be used to attach the vertical member to a door jamb or head of a doorway. In the case where the top brick of a pier or column at the side of a doorway becomes loose, then this problem can be solved without the use of an extension bracket which was the case of the prior art in two ways. Thus the vertical member on each side of the doorway may be raised so that it may engage with the head of the doorway with the horizontal member on each side of the doorway being approximately half-way down the length of the vertical member. This is shown in FIG. 3 wherein attachment apertures 14A may be attached to the head. Alternatively the horizontal members may be raised to the top of their respective vertical members as shown in FIG 2. In this latter case fixing of the vertical member may occur at the lowermost aperture 14B to the jamb and a central aperture 14C to the head.

Figure 4:
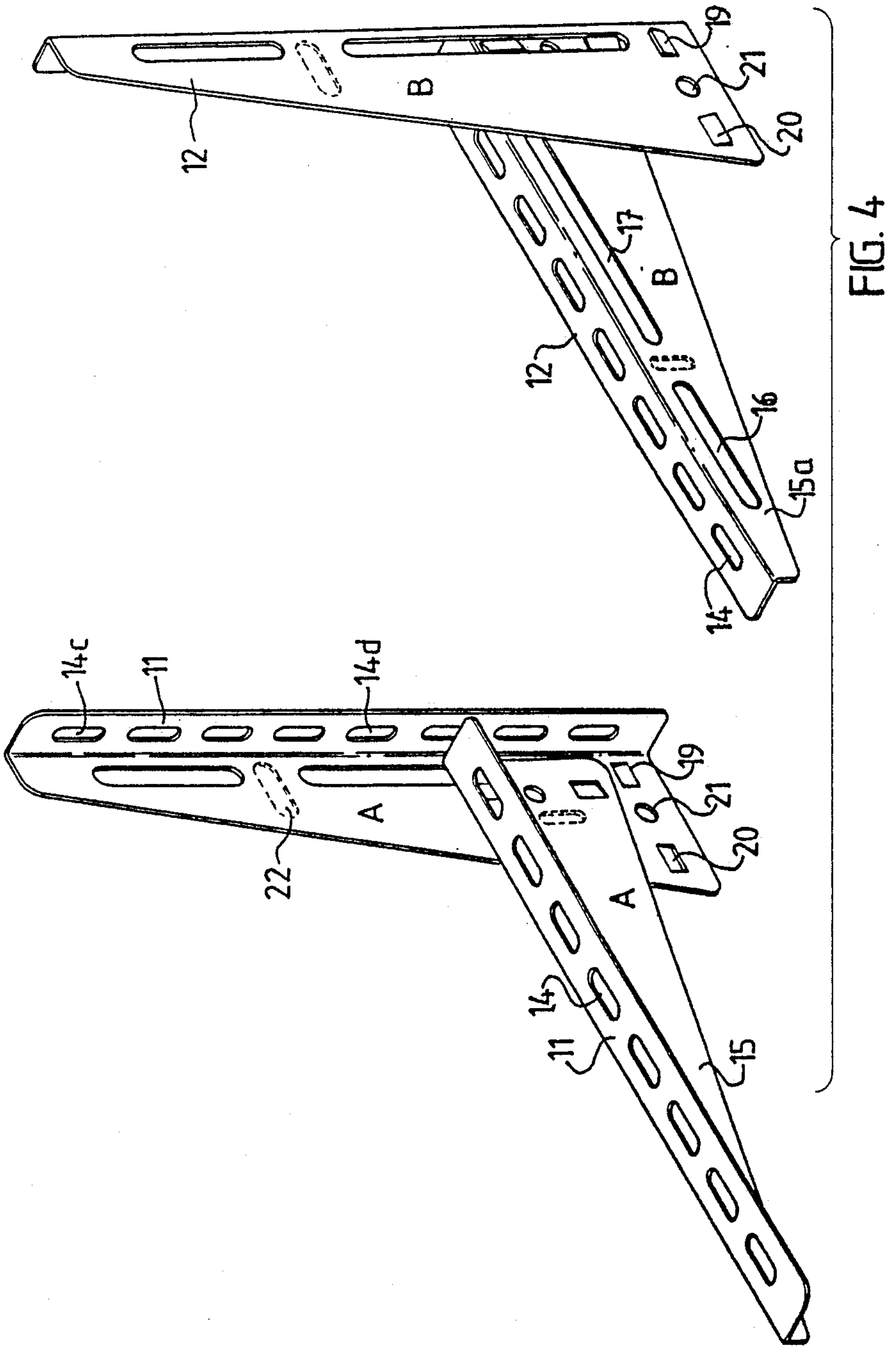
FIG. 4 is a similar view to FIG. 3 showing further adjustment of the respective horizontal members whereby each bracket assembly may be attached to the head of a doorway.

If the necessity arises to fix entirely to the head this can be carried out by reversal of the arrangement shown in FIGS. 2 and 3 wherein two members 11 may be used on one side of the doorway and two members 12 may be used on the other side of the doorway. In each case engagement arms 15 and 15A may depend downwardly as shwon and attachment arms 13 and 13A occupying a common plane as shown in FIG. 4. It is then possible to fix each of the vertical members to the head using attachment apertures 14C and 14D as indicated.

Figure 5:
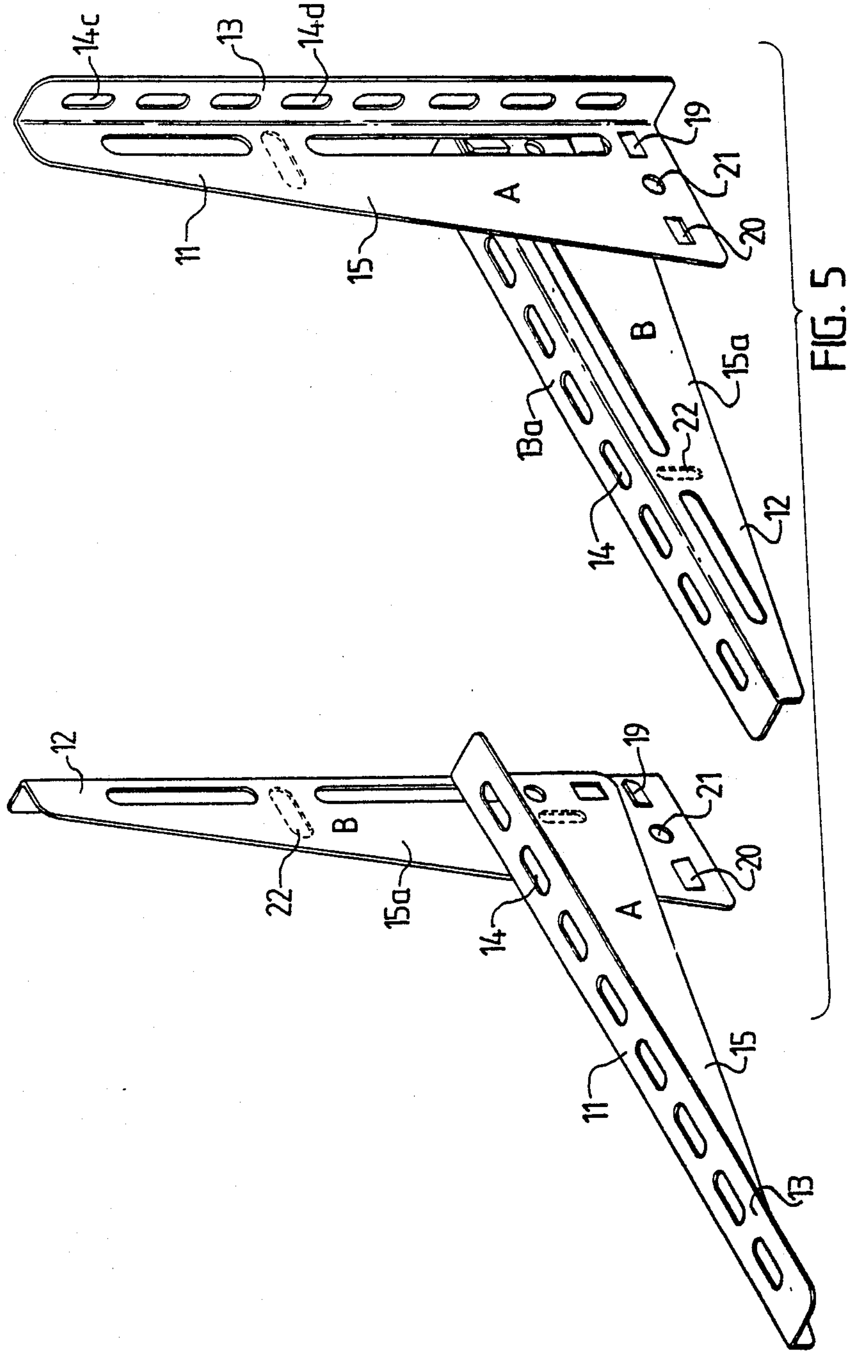
FIG. 5 is a similar view to FIG. 2 but wherein each vertical member is reversed in orientation.

The same result achieved in FIG. 4 can also be carried out with the reversal of each of the vertical membes as shown in FIG. 5 wherein each assembly 10 includesone member 11 and the other member 12. Again the vertical members are attached to the head using attachment apertures 14C and 14D.

Figure 6:
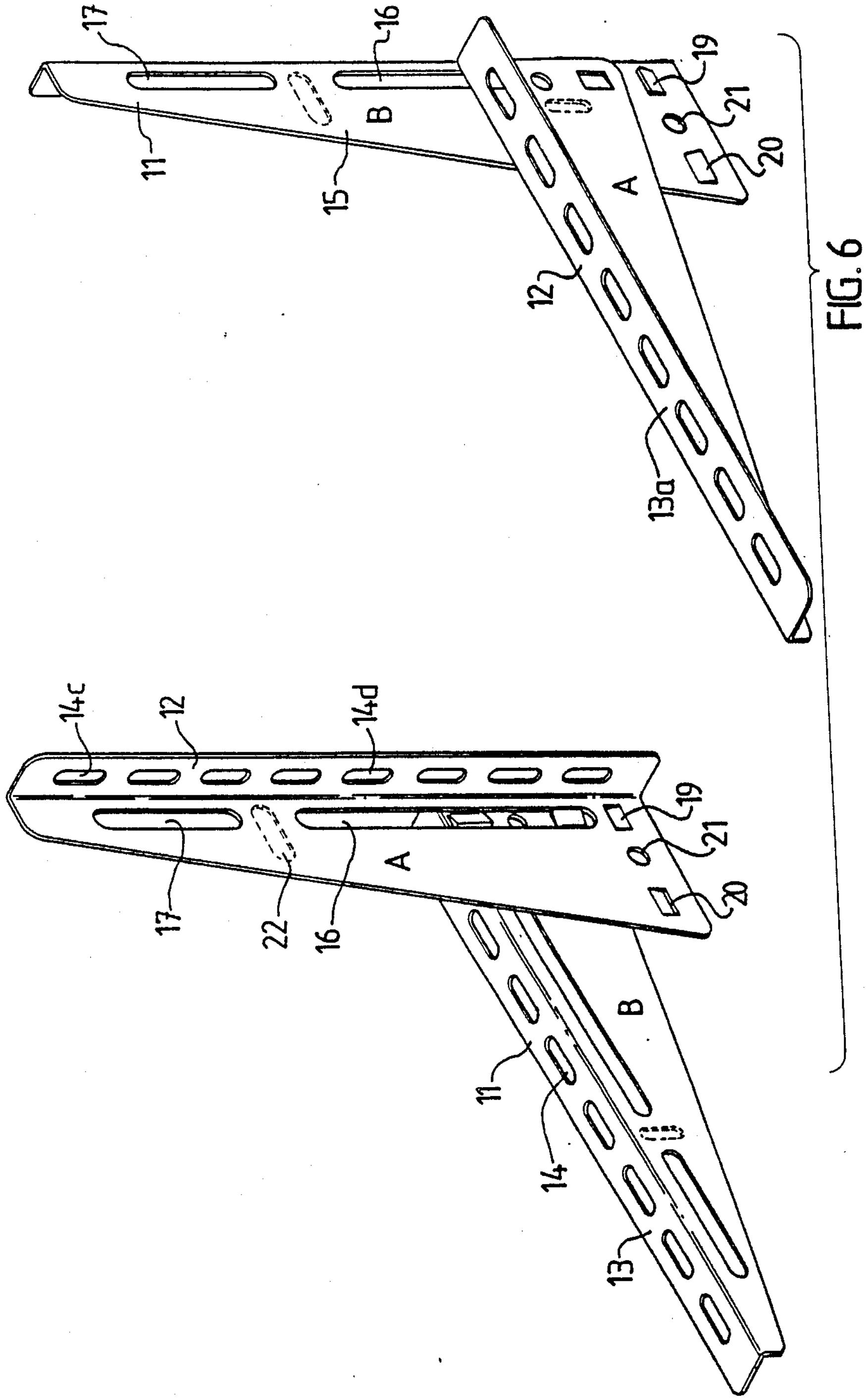
FIG. 6 is a similar view to FIG. 2 but wherein each of the horizontal members are reversed in orientation.

FIG. 6 further illustrates the versatility of the bracket assembly of the invention wherein each of the horizontal members 11 and 12 are reversed as shown in contrast to the arrangement shown in FIG. 5 to achieve a similar result wherein attachment apertures 14C and 14D may be attached directly to the head. Projections 19 and 20 are also clearly shown as being oriented in different directions.

It also should be stressed that in tight situations with very small returns to the sides of the doorway a single member 11 and a single member 12 may be attached directly to the side wall adjacent the opening by attachment or fixing through elongate slots 16 and 17. This arrangement is shown in FIG. 1. This of course means that vertical adjustment is lost but two vertical slots shown in dotted outline at 22 may be incorporated for this purpose.

Figure 7:
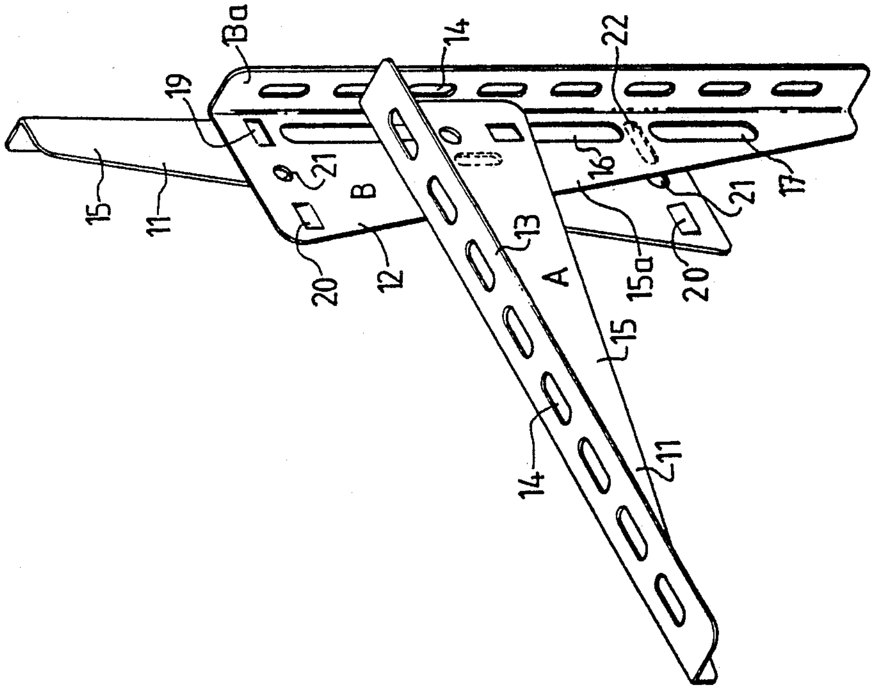
FIG. 7 is a view showing attachment to each other of two adjacent vertical members to provide an extended vertical section.
Figure 8:
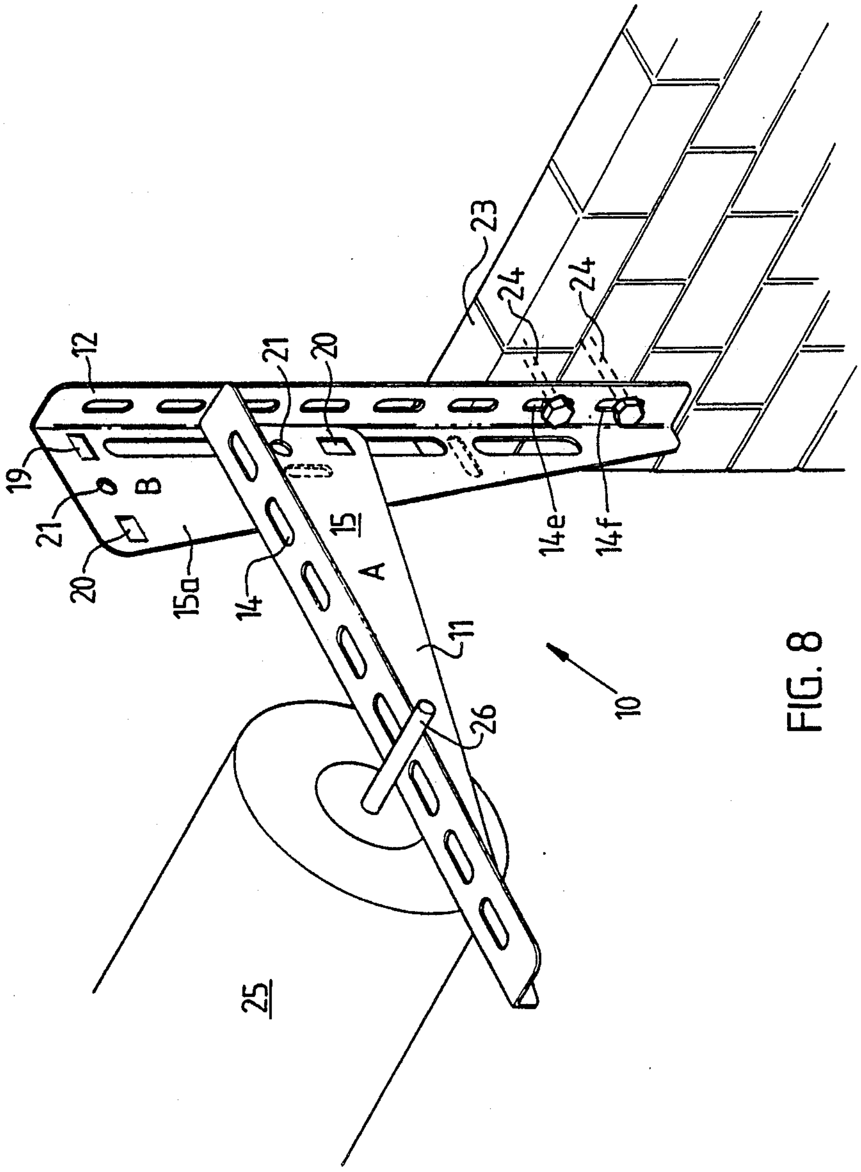
FIG. 8 shows attachment of a bracket assembly as shown in FIG. 1 to a jamb of a doorway.

If an absolutely extreme situation arises it is possible to extend the vertical members by joining two members 11 and two members 12 together to provide an extremely long vertical length. This can be done by first hammering projections 19 and 20 flat and attaching two vertical members to each other as shown in FIG. 7. In this arrangement slots 22 may be used to attach vertical members to each other as shown wherein slot 22 may be aligned with aperture 21. In FIG. 8 there is shown an arrangement where a bracket assembly 10 may be attached to a jamb 23 where bolts 24 are attached to jamb 23 through apertures 14E and 14F. Roller door 25 may then be attached to horizontal member 11 as shown by securing lug 26. As shown lugs 20 and 19 are securely retained in elongate slot 17 to prevent any relative rotation between members 11 and 12.

In FIG. 9 there is shown a bracket assembly 10 being attached only to a head member 27 such as a floor joist. In this arrangement arm 13A of member 12 may abut surface 29 of floor joist 27 and bolts 28 may extend through the two topmost apertures 14 of member 12 to be attached directly to surface 29. Engagement arm 15A abuts with surface 30 of floor joist 27 as shown.

In FIG. 10 again a bracket assembly 10 is shown attached to floor joist or head member 27. However, in contrast to the arrangement shown in FIG. 9 the horizontal member 11 is reversed with arm or flange 13 depending downwardly from engagement arm or flange 15 instead of upwardly as shown in FIG. 9. Roller door centre axle may be suspended from beneath horizontal member 11 and may be attached thereto by any appropriate means such as a U bolt (not shown).

In FIG. 11 there is also shown the attachment of bracket assembly 10 to head member or floor joist 27 by bolts 28 to surface 29 of head member 27 otherwise the arrangement is as shown in FIG. 9.

In FIG. 12 it will be clear that both retaining projections 19 and 20 are oriented in different directions as shown having regard to the plane of engagement arm 15 or 15A. This feature assists in retention of projections 19 and 20 of the first member in slots 16 or 17 of the second member.

From the foregoing it can be appreciated that the bracket assembly of the invention is effective in use and extremely versatile in nature thereby substantially overcoming the deficiencies of the prior art already discussed above.

It will also be appreciated that the invention also includes within its scope the first or second member per se as well as the bracket assembly.

The claims defining the invention are as follows:

1. A bracket assembly including a first member and a second member wherein each of said first member and second member have an engagement arm and an attachment arm whereby said attachment arm includes a plurality of attachment apertures or a single attachment slot and said engagement arm includes one or more retaining projections and a retaining aperture as well as one or more elongate slots whereby in use each of said first member and said second member may be oriented so that one of said members is oriented substantially vertically and the other of said members is oriented substantially horizontally having regard to the periphery of a doorway whereby a pair of said bracket assemblies may be located on opposite sides of said doorway and said one or more retaining projections and said retaining aperture of the engagement arm of one member may be oriented with an adjacent elongate slot of the engagement arm of the other member and each of the attachment arms of both members may be attached to the doorway periphery or a door adapted to close said doorway.

2. A bracket assembly as claimed in claim 1 wherein in each of the engagement arms of said first member and said second member said retaining projections and retaining aperture are located adjacent to said elongate slot and below or above said elongate slot having regard to the orientation of said engagement arm.

3. A bracket assembly as claimed in claim 2 wherein a first retaining projection is substantially collinear with an adjacent elongate slot.

4. A bracket assembly as claimed in claimed 3 wherein there is further provided a retaining aperture and a second retaining projection located laterally of said first retaining projection and collinear therewith.

5. A bracket assembly as claimed in claim 1, wherein said engagement arm and said attachment arm are oriented at right angles to each other.

* * * * *